(12) United States Patent
Koll et al.

(10) Patent No.: US 8,254,232 B2
(45) Date of Patent: Aug. 28, 2012

(54) INDICATION OF OPTICALLY WRITABLE OPTICAL DISC SURFACE INCIDENT TO LASER

(75) Inventors: Andrew Koll, Albany, OR (US); Andy Van Brocklin, Corvallis, OR (US); Daryl E Anderson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2579 days.

(21) Appl. No.: 10/352,737

(22) Filed: Jan. 28, 2003

(65) Prior Publication Data

US 2004/0146001 A1 Jul. 29, 2004

(51) Int. Cl.
*G11B 15/04* (2006.01)

(52) U.S. Cl. ..................... 369/53.2; 369/53.22

(58) Field of Classification Search ............... 369/53.12, 369/53.13, 53.2, 53.21, 53.22, 53.37, 53.41, 369/53.42, 53.45

See application file for complete search history.

(56) References Cited

U.S. PATENT DOCUMENTS

| 4,497,049 A | * | 1/1985 | d'Alayer de Costemore d'Arc ......................... 369/47.11 |
| 4,723,234 A | * | 2/1988 | Katsuyama et al. ....... 369/53.28 |
| 5,309,249 A | | 5/1994 | Ishii |
| 6,020,977 A | * | 2/2000 | Kim .............................. 358/1.7 |
| 6,091,675 A | | 7/2000 | Lee |
| 6,286,363 B1 | * | 9/2001 | Discenzo .................... 73/53.01 |
| 6,408,330 B1 | * | 6/2002 | DeLaHuerga ............... 709/217 |
| 6,769,603 B2 | * | 8/2004 | Nagai et al. .................. 235/375 |

FOREIGN PATENT DOCUMENTS

JP P20020203321 7/2002

OTHER PUBLICATIONS

Lightscribe "how it works," www.lightscribe.com, copyright 2005.

* cited by examiner

*Primary Examiner* — Paul Huber

(57) ABSTRACT

A mass-storage device according to an embodiment of the invention is disclosed that includes a laser and an indication mechanism. The laser at least optically writes to an optically writable surface of an optical disc incident to the laser. The indication mechanism indicates whether the optically writable surface incident to the laser is an optically writable label surface or an optically writable data surface of the optical disc.

37 Claims, 6 Drawing Sheets

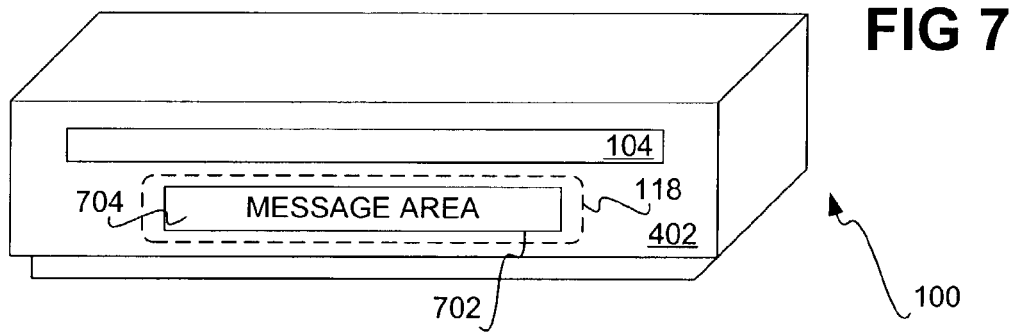
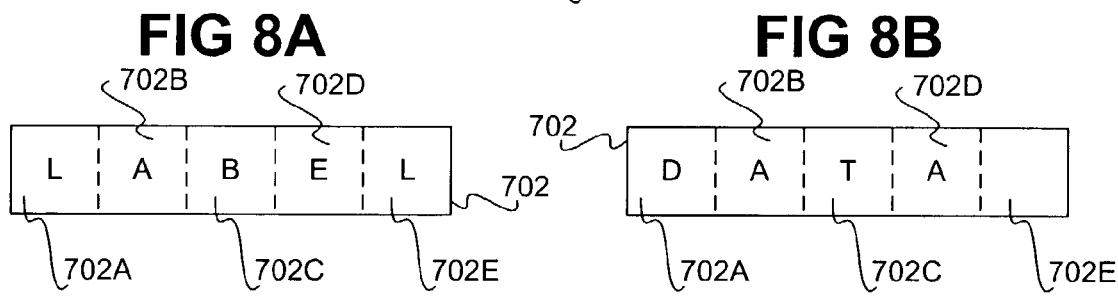
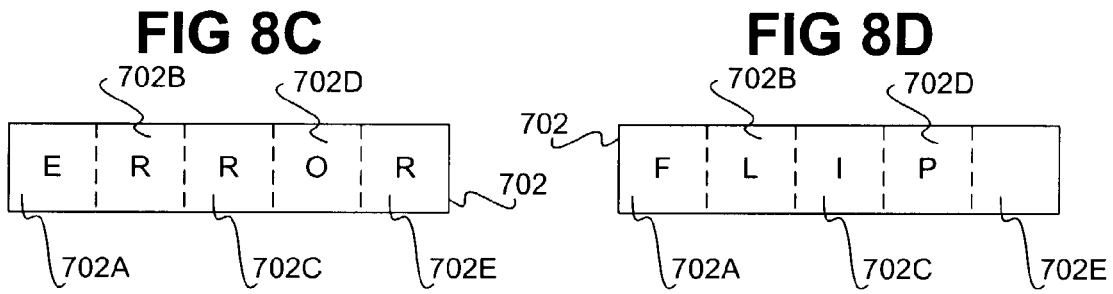
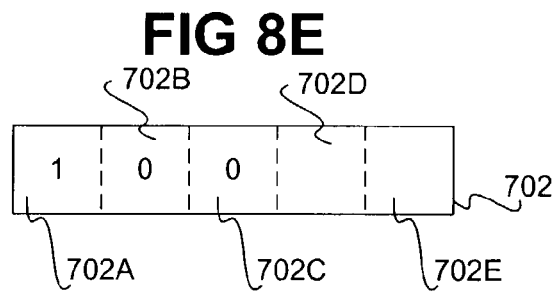

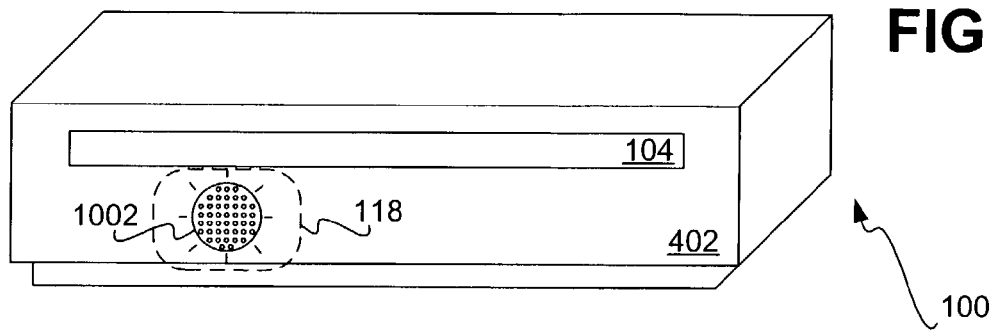
FIG 10
FIG 11A
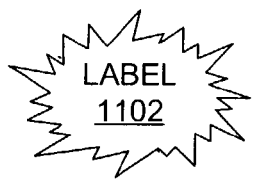
FIG 11B
FIG 11C
FIG 11D
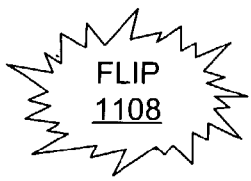
FIG 11E
FIG 12
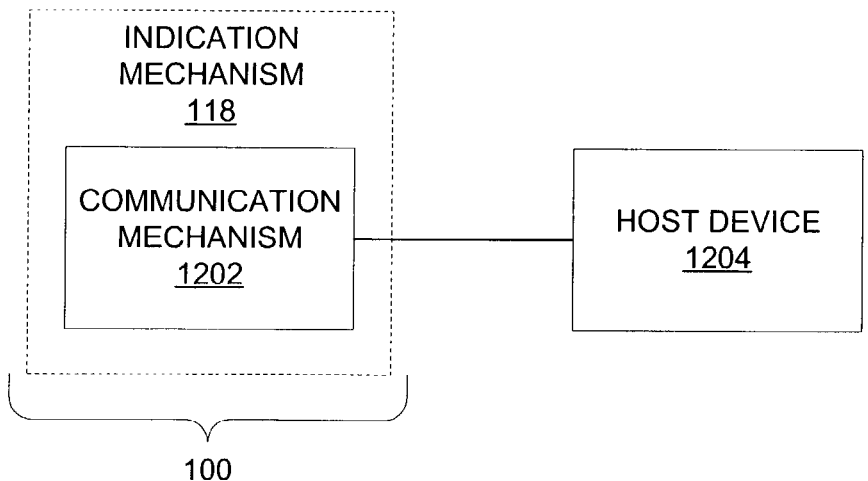

INDICATION OF OPTICALLY WRITABLE OPTICAL DISC SURFACE INCIDENT TO LASER

BACKGROUND

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. In the case of DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special pre-cut labels that can be printed on with inkjet or other types of printers can also be used. However, this is a laborious process: the labels must be carefully aligned on the discs, and so on. Special-purpose printers that print directly on the discs can be used, but such printers are fairly expensive.

In the patent application entitled "Integrated CD/DVD Recording and Label", filed on Oct. 11, 2001, and assigned Ser. No. 09/976,877, a solution to these difficulties is described, in which a laser is used to label optical discs. Such an optical disc may have an optically writable label surface, or side, and an optically writable data surface, or side. Before an optical disc is labeled, a user may, however, have difficulty discerning the optically writable label side of the disc from the optically writable data side of the disc.

SUMMARY OF THE INVENTION

A mass-storage device according to an embodiment of the invention includes a laser and an indication mechanism. The laser at least optically writes to an optically writable surface of an optical disc incident to the laser. The indication mechanism indicates whether the optically writable surface incident to the laser is an optically writable label surface or an optically writable data surface of the optical disc.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 7 is a diagram of a mass-storage device having a display as part of an indication mechanism, according to an embodiment of the invention.

FIGS. 8A, 8B, 8C, 8D, and 8E are diagrams depicting different messages that can be displayed on the display of FIG. 7, according to varying embodiments of the invention.

FIGS. 9A and 9B are diagrams of display parts that can implement the display of FIG. 7, according to varying embodiments of the invention.

FIG. 10 is a diagram of a mass-storage device having an audio indicator as part of an indication mechanism, according to an embodiment of the invention.

FIGS. 11A, 11B, 11C, 11D, and 11E are diagrams depicting different audio indications that can be emitted by the audio indicator of FIG. 10, according to varying embodiments of the invention.

FIG. 12 is a diagram of a mass-storage device having a communication mechanism as part of an indication mechanism, according to an embodiment of the invention.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Mass-Storage Device

Figure 1:
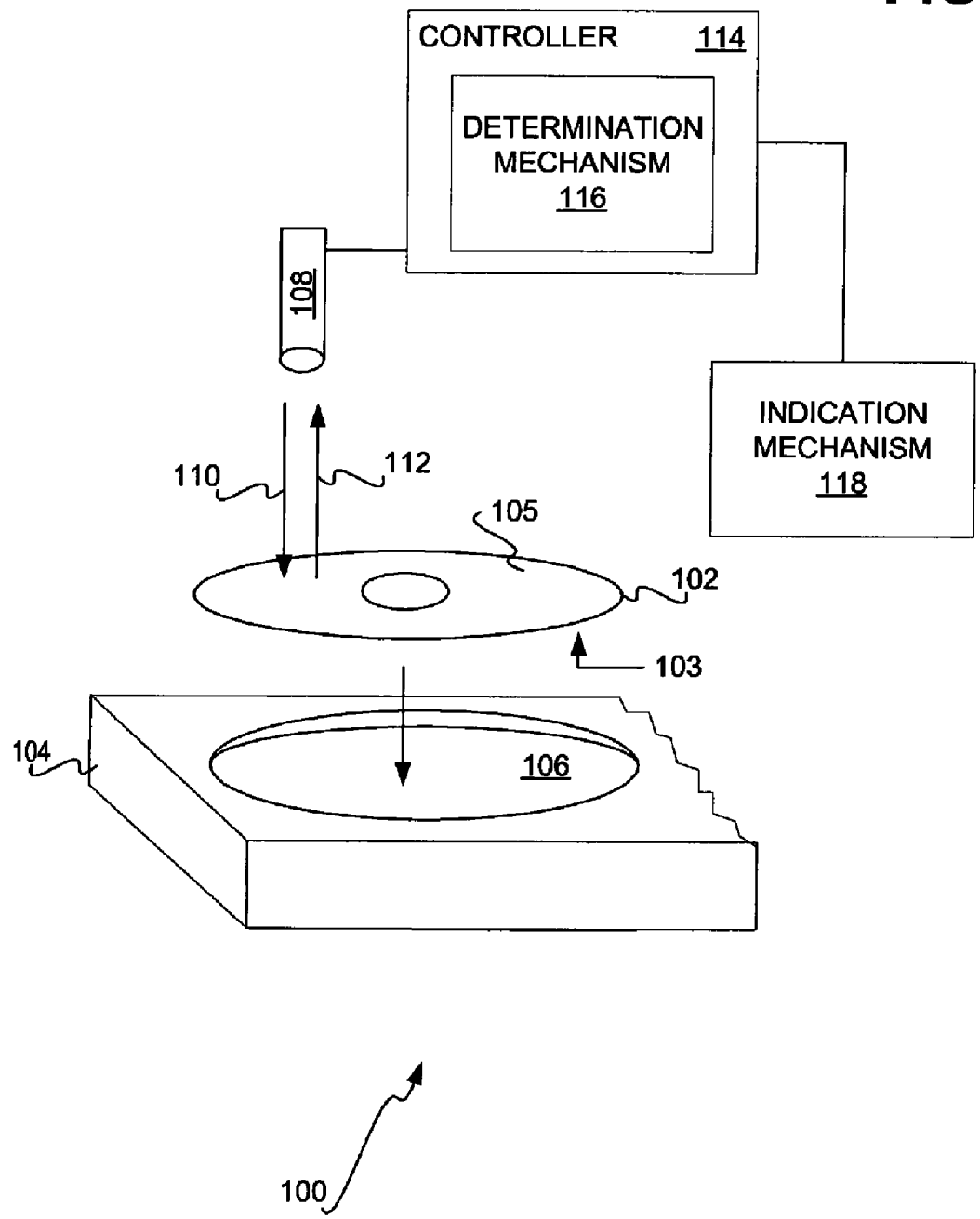
FIG. 1 is a diagram of a mass-storage device, according to an embodiment of the invention.

FIG. 1 shows a mass-storage device 100 according to an embodiment of the invention. As can be appreciated by those of ordinary skill within the art, the device 100 may include components other than those depicted in FIG. 1. The mass-storage device 100 includes a loading mechanism 104 having a seat 106 in which an optical disc 102 can rotatably rest. The mechanism 104 is generally receptive to the optical disc 102, and may include motors and other components not shown in FIG. 1. The mechanism 104 is depicted in FIG. 1 as a tray, but may also be such that the optical disc 102 is fed or inserted directly thereinto, instead of being placed on a tray.

The optical disc 102 has a surface, or side, 105 that is incident to a laser 108 of the mass-storage device 100, as well as a surface, or side, 103 that is not incident to the laser 108. Both the surfaces 103 and 105 are preferably optically writable. One of the surfaces 103 and 105 may be an optically writable data surface, whereas another of the surfaces 103 and 105 may be an optically writable label surface. The optically writable data surface is primarily intended for the writing, or storage, of computer-readable data. For example, the data surface may provide for the optical writing of data thereto as a CD-R, CD-RW, DVD-R, a DVD-RW, a DVD+R, a DVD+

RW, a DVD+RAM, and/or another type of optical disc, such as a Blu-ray optical disc. By comparison, the optically writable label surface is primarily intended for the optical writing of human-readable markings. In one embodiment, the optical disc 102 is in accordance with the patent application entitled "Integrated CD/DVD Recording and Label", filed on Oct. 11, 2001, and assigned Ser. No. 09/976,877.

The surfaces 103 and 105 may have different compositions and/or properties, such that the optically writable label surface cannot have data written thereto as can the optically writable data surface, and the optically writable data surface cannot have markings written thereto as can the optically writable label surface. However, the surfaces 103 and 105 may nevertheless appear similar or identical to one another to casual or even more sophisticated users. Thus, a user may mistakenly insert the optical disc 102 into the mass-storage device 100 so that the optically writable data surface is incident to the laser 108, when the user had intended to have the laser 108 write markings to the optically writable label surface, and vice-versa.

The laser 108 of the mass-storage device 100 emits signals 110 and senses signals 112 reflected by the optical disc 102 as the disc 102 rotates in the mechanism 104. As such, the laser 108 and/or the device 100 may include a sensor to sense or detect the signals 112 reflected by the optical disc 102. The laser 108 thus is for reading information from and/or writing information to the optical disc 102, such as data to the optically writable data surface of the optical disc 102, and such as markings to the optically writable label surface of the optical disc 102.

The mass-storage device 100 also includes a controller 114. The controller 114 may be software, hardware, or a combination of software and hardware. The controller 114 controls the laser 108. The controller 114 is able to identify properties of the label side of the optical disc 102 from the information read by the laser 108. The controller 114 can also direct the laser 108 to write to the optical disc 102, such as to write protect the disc 102, to write a mark on the disc 102, and so on. The controller 114 includes a determination mechanism 116 that is able to determine whether the surface 105 of the optical disc 102 incident to the laser 108 is an optically writable label surface, an optically writable data surface, or a non-optically writable surface. In one embodiment, the determination mechanism 116 determines the type of the surface 105 of the disc 102 incident to the laser 108 in accordance with the patent application entitled "Identifying Optical Disc Properties from Information Read from Label Side of Optical Disc", filed on Mar. 20, 2002, assigned Ser. No. 10/103,043, and published as US patent publication no. 20030179674, which is hereby incorporated by reference.

The mass-storage device 100 also includes an indication mechanism 118. The indication mechanism 118 indicates whether the surface 105 of the optical disc 102 that is incident to the laser 108 is an optically writable label surface, an optically writable data surface, or a non-optically writable surface. Thus, the user is able to discern the surface of the optical disc 102 that he or she has inserted into the mass-storage device 100 that can be read from or written to using the laser 108. The indication mechanism 118 is preferably controlled by the controller 114. The controller 114 controls the indication mechanism 118 based on whether the determination mechanism 116 has determined that the surface 105 of the disc 102 is an optically writable label surface, an optically writable data surface, or a non-optically writable surface. Specific embodiments of the indication mechanism 118 are described in the next section of the detailed description.

Figure 2:
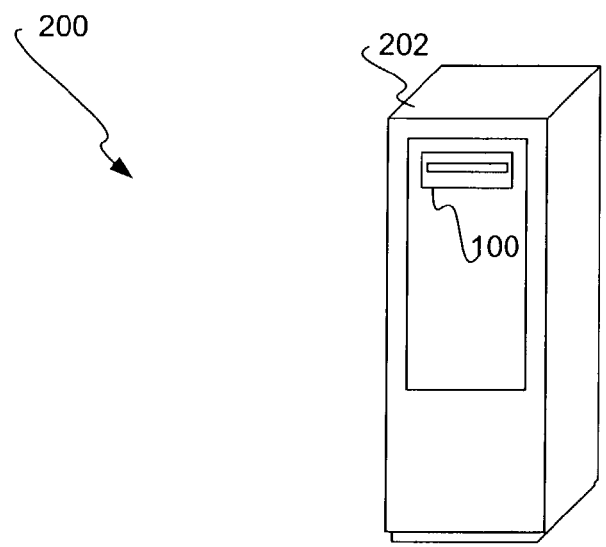
FIG. 2 is a diagram of the mass-storage device of FIG. 1 as an internal component of a computer, according to an embodiment of the invention.
Figure 3:
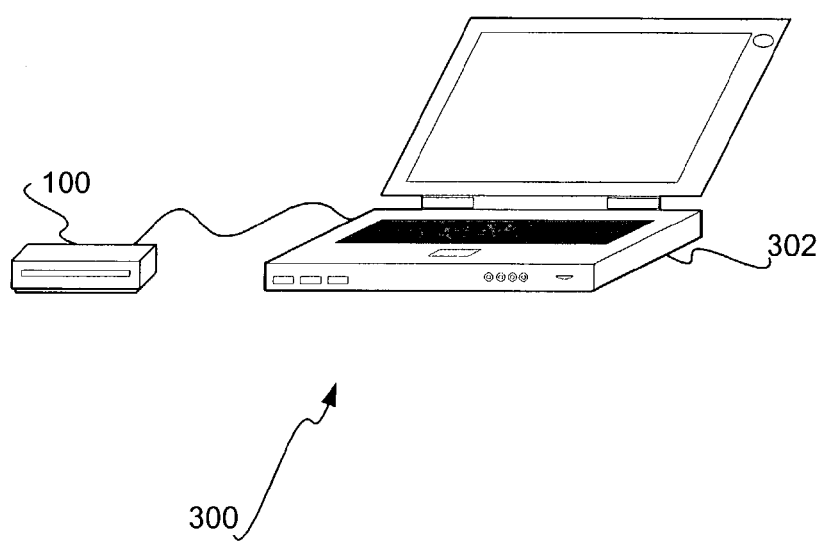
FIG. 3 is a diagram of the mass-storage device of FIG. 1 as an external peripheral to a computer, according to an embodiment of the invention.

The mass-storage device 100 may be part of a computer, such as a desktop or laptop computer. The mass-storage device 100 may also be encased in an enclosure internally or externally connectable to a computer. FIG. 2 shows a system 200 according to an embodiment of the invention that includes a desktop tower computer 202 in which the mass-storage device 100 is encased in an enclosure that has been internally connected to the computer 202. Whereas the computer 202 is depicted in FIG. 2 as a desktop computer, it may also be a laptop computer, or another type of computer. By comparison, FIG. 3 shows a system 300 according to an embodiment of the invention that includes a laptop computer 302 in which the mass-storage device 100 is enclosed in an enclosure that has been externally connected to the computer 302. Whereas the computer 302 is depicted in FIG. 3 as a laptop computer, it may also be a desktop computer, or another type of computer.

Indication Mechanism

Figure 4:
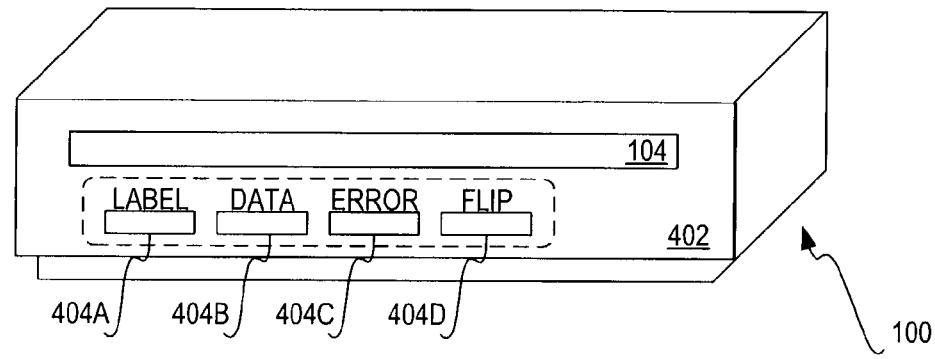
FIG. 4 is a diagram of a mass-storage device having a number of single-color lights as part of an indication mechanism, according to an embodiment of the invention.

FIG. 4 shows the mass-storage device 100 in which the indication mechanism 118 includes a number of single-color lights 404, according to an embodiment of the invention. The mass-storage device 100 has a front surface 402 in which the lights 404 are disposed, and to which the loading mechanism 104 is flush when in a recessed position. The single-color lights 404 include a label light 404A, a data light 404B, an error light 404C, and/or a flip light 404D. Each of the lights 404 can be turned on or off. That is, each of the lights 404 is either lit or non-lit. One or more of the lights 404 are lit by the controller 114 of FIG. 1 based on, for instance, the surface of the optical disc that is incident to the laser 108 of FIG. 1. The lights 404A may each be light-emitting diodes (LED's), or other types of lights.

The label light 404A is lit to indicate that the optically writable label surface of the optical disc inserted into the mass-storage device 100 is incident to the laser 108 of FIG. 1. The data light 404B is lit to indicate that the optically writable data surface of the optical disc is incident to the laser 108 of the device 100. The error light 404C is lit to indicate that an unknown surface of the optical disc is incident to the laser 108 of the device 100, such as a non-optically writable surface. The flip light 404D is lit to instruct the user to remove the optical disc from the mass-storage device 100, flip it over, and re-insert the disc into the device 100 so that the opposite side is incident to the laser 108.

For example, if the laser 108 of FIG. 1 is attempting to write markings to the optically writable label surface of the optical disc, but the optically writable data surface of the disc is incident to the laser 108, then the lights 404B and 404C may be lit. This indicates that the data surface is incident to the laser 108, and that the user should remove, flip over, and re-insert the disc into the mass-storage device 100, so that the laser 108 can properly write markings to the optically writable label surface of the optical disc. Once the user has done so, then the light 404A is lit to indicate that the optically writable label surface is incident to the laser 108.

Figure 5:
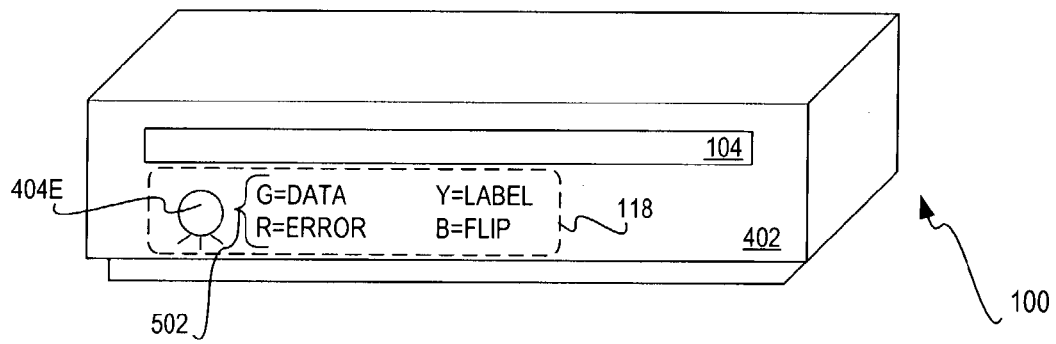
FIG. 5 is a diagram of a mass-storage device having a multiple-color light as part of an indication mechanism, according to an embodiment of the invention.

FIG. 5 shows the mass-storage device 100 in which the indication mechanism 118 includes one multiple-color light 404E, according to an embodiment of the invention. The light 404E is disposed within the front surface 402 of the mass-storage device 100, to which the loading mechanism 104 is flush in its recessed position. The multiple-color light 404E may be able to be lit in one of a number of different colors. For example, the light 404E may be able to be lit in green, yellow, red, and/or blue, based on, for instance, the surface of the optical disc that is incident to the laser 108 of FIG. 1. The light 404E may be an LED, or another type of light. Furthermore, there may be more than one such light in one embodiment of the invention.

In accordance with a legend 502 situated on the front surface 402 of the mass-storage device 100, the light 404E may be lit in one embodiment as follows. The light 404E is lit in green to indicate that the optically writable data surface of the optical disc inserted into the device 100 is incident to the laser 108 of FIG. 1. The light 404E is lit in yellow to indicate that the optically writable label surface of the disc is incident to the laser 108 of the device 100. The light 404E is lit in red to indicate that an unknown surface of the optical disc is incident to the laser 108, such as a non-optically writable surface. The light 404E is lit in blue to instruct the user to remove the optical disc from the mass-storage device 100, flip it over, and re-insert the disc into the device 100.

Figure 6:
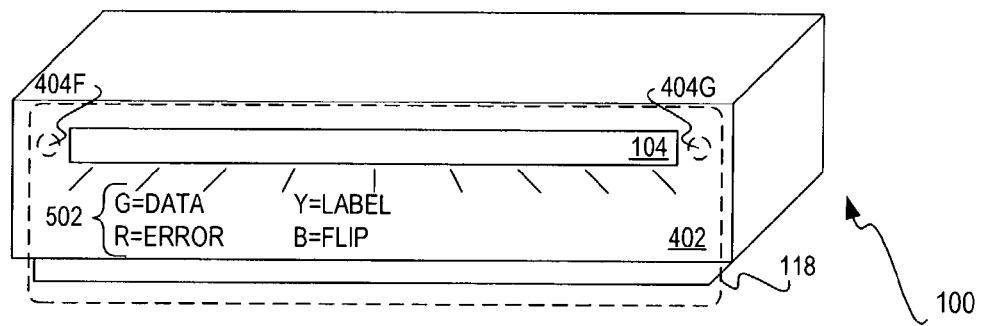
FIG. 6 is a diagram of a mass-storage device having a translucent loading mechanism as part of an indication mechanism, according to an embodiment of the invention.

FIG. 6 shows the mass-storage device 100 in which the indication mechanism 118 includes lights 404F and 404G, and the loading mechanism 104 is translucent, according to an embodiment of the invention. The lights 404F and 404G are indicated as dotted in FIG. 6 because they are disposed behind the front surface 402 of the mass-storage device 100. More specifically, the lights 404F and 404G are disposed to either side of the loading mechanism 104. Because the loading mechanism 104 is translucent, when either or both the lights 404F and 404G are lit, the effect is that the loading mechanism 104 itself appears to be lit, as if the light were emanating from the mechanism 104.

The lights 404F and 404G may be multiple-color lights, like the light 404E of the embodiment of FIG. 5, such that there is the legend 502 to indicate what each color means. Thus, the lights 404F and 404G are both lit in a given color based on the legend 502. There may also be more or less than two such lights. In another embodiment, the lights 404F and 404G may be single-color lights, like the lights 404A, 404B, 404C, and 404D of the embodiment of FIG. 4, such that only one of the lights 404F and 404G is lit at a time. In this embodiment, there may be more than two such lights.

FIG. 7 shows the mass-storage device 100 in which the indication mechanism 118 includes a display 702 having a message area 704, according to an embodiment of the invention. The display 702 is disposed within the front surface 402 of the mass-storage device 100, to which the loading mechanism 104 is flush when in a recessed position. The message area 704 of the display 702 is able to convey messages based on, for instance, the surface of the optical disc that is incident to the laser 108 of FIG. 1. The display 702 may be a liquid crystal display (LCD), or another type of display.

FIGS. 8A, 8B, 8C, 8D, and 8E show different messages that the display 702 can display, according to varying embodiments of the invention. In FIG. 8A, the display 702 includes display parts 702A, 702B, 702C, 702D, and 702E, each of which is able to display a different character. The display 702 may also have more or less such display parts. More specifically, the display parts 702A, 702B, 702C, 702D, and 702E display the letters L, A, B, E, and L, respectively, to in totality display the message "LABEL" to the user. This message may be displayed on the display 702 when the optically writable label surface of the optical disc inserted into the mass-storage device 100 is incident to the laser 108 of FIG. 1.

In FIG. 8B, the display parts 702A, 702B, 702C, and 702D display the letters D, A, T, and A, respectively, to in totality display the message "DATA" to the user. The display part 702E does not display a character. This message may be displayed on the display 702 when the optically writable data surface of the optical disc inserted into the mass-storage device 100 is incident to the laser 108 of FIG. 1. In FIG. 8C, the display parts 702A, 702B, 702C, 702D, and 702E display the letters E, R, R, O, and R, respectively, to in totality display the message "ERROR" to the user. This message may be displayed on the display 702 when the surface of the optical disc incident to the laser 108 is non-optically writable.

In FIG. 8D, the display parts 702A, 702B, 702C, and 702D display the letters F, L, I, and P, respectively, to in totality display the message "FLIP" to the user. The display part 702E does not display a character. This message may be displayed on the display 702 to instruct the user to remove the optical disc inserted into the mass-storage device 100, flip it over, and re-insert the disc into the device 100. Finally, in FIG. 8E, the display parts 702A, 702B, and 702C display the numbers 1, 0, and 0, respectively, to in totality display the message "100" to the user. The display parts 702D and 702E do not display characters. This message may be displayed on the display 702 to indicate the amount of space used or remaining on the optically writable surface of the optical disc incident to the laser 108 of FIG. 1, in percentage terms, in number of megabytes, and so on.

FIGS. 9A and 9B depict a display part 902, according to varying embodiments of the invention, that can be used to implement each of the display parts 702A, 702B, 702C, 702D, and 702E of the display 702. In FIG. 9A, the display part 902 has seven display segments 904A, 904B, 904C, 904D, 904E, 904F, and 904G, collectively referred to as the display segments 904. The display segments 904 can be independently lit, and are lit in accordance with a desired character to be displayed on the display part 902. For example, to display the letter E, the segments 904A, 904B, 904D, 904E, and 904G are lit, whereas to display the letter R, all of the segments 904 are lit except for the segment 904G.

In FIG. 9B, the display part 902 is a dot-matrix display part, having a number of pixels organized in columns 952 and rows 954. The pixels are independently lit, and are lit in accordance with a desired character to be displayed on the display part 902. The dot-matrix display part 902 of the embodiment of FIG. 9B allows for more accurately drawn characters than the multiple-segment display part 902 of the embodiment of FIG. 9A.

FIG. 10 shows the mass-storage device 100 in which the indication mechanism 118 includes a speaker 1002, according to an embodiment of the invention. The speaker 1002 is more generally an audio indicator. The speaker 1002 is disposed within or behind the front surface 402 of the mass-storage device 100, to which the loading mechanism 104 is flush when in a recessed position. The speaker 1002 is able to emit audio indications, such as spoken utterances or indications, tonal or other simple audio indications, and/or sound or other more complex audio indications, based on, for instance, the surface of the optical disc that is incident to the laser 108 of FIG. 1.

FIGS. 11A, 11B, 11C, 11D, 11E show different audio indications that may be emitted by the speaker 1002, according to varying embodiments of the invention. In FIG. 11A, an audio indication 1102 corresponding to the word "label" is emitted, when the optically writable label surface of the optical disc inserted into the mass-storage device 100 is incident to the laser 108 of FIG. 1. The audio indication 1102 may actually be the word "label" being spoken, or may be another type of audio indication that corresponds thereto. In FIG. 11B, an audio indication 1104 corresponding to the word "data" is emitted, when the optically writable data surface of the optical disc inserted into the device 100 is incident to the laser 108. The audio indication 1104 may actually be the word "data" being spoken, or may be another type of audio indication that corresponds thereto.

In FIG. 11C, an audio indication 1106 corresponding to the word "error" is emitted, when the surface of the optical disc inserted into the mass-storage device 100 that is incident to the laser 108 of FIG. 1 is not an optically writable surface. The audio indication 1106 may actually be the word "error" being spoken, or may be another type of audio indication that corresponds thereto. In FIG. 11D, an audio indication 1108 corresponding to the word "flip" is emitted, to instruct the user to remove the optical disc in the device 100, flip it over, and re-insert the disc into the device 100. As before, the audio indication 1108 may actually be the word "flip" being spoken, or may be another type of audio indication that corresponds thereto. Finally, in FIG. 11E, an audio indication 1108 corresponding to the phrase "one-hundred percent" is emitted, to convey to the user the amount of space used or remaining on the optically writable surface of the optical disc incident to the laser 108.

FIG. 12 shows the mass-storage device 100 in which the indication mechanism 118 includes a communication mechanism 1202, according to an embodiment of the invention. The communication mechanism 1202 conveys to a host device 1204 whether the surface of the optical disc inserted in the device 100 and incident to the laser 108 is an optically writable label surface, an optically writable data surface, or a non-optically writable surface. That is, the communication mechanism 1202 communicates indication of the type of surface of the optical disc incident to the laser 108, to the host device 1204. The host device 1204 in turn conveys this information to the user. The host device 1204 is thus communicatively coupled to the mass-storage device 100. The communication mechanism 1202 can include a wired or wireless connection, a direct or network connection, and/or another type of communication mechanism.

Methods

Figure 13:
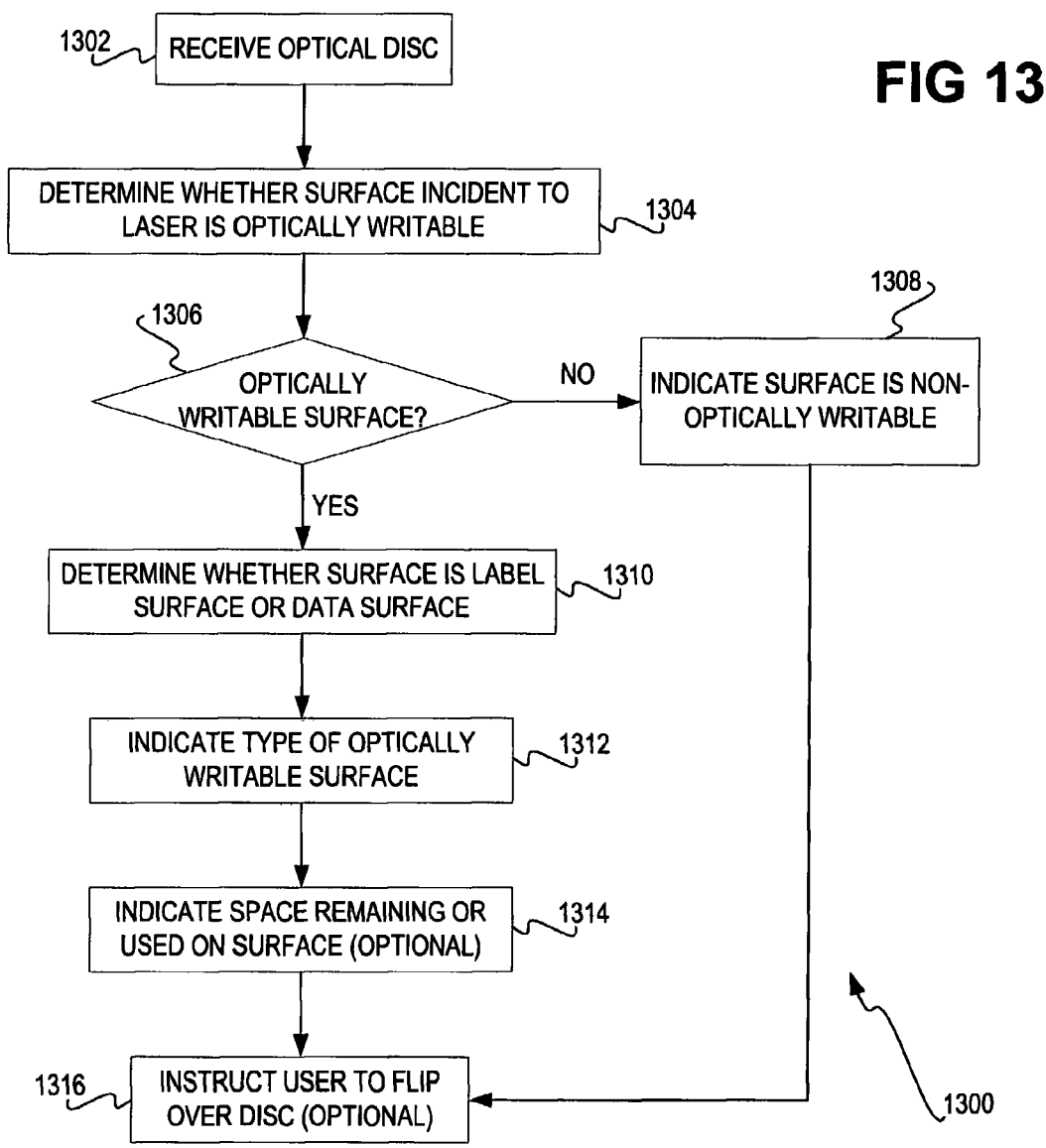
FIG. 13 is a flowchart of a method of use, according to an embodiment of the invention.

FIG. 13 shows a method 1300, according to an embodiment of the invention. The method 1300 is preferably performed by the mass-storage device 100 that has been described. First, an optical disc is received by the mass-storage device 100 (1302). The optical disc may be received by the loading mechanism 104 of FIG. 1, for example. The mass-storage device 100 determines whether the surface of the optical disc incident to the laser 108 of FIG. 1 is optically writable (1304). The determination mechanism 116 of FIG. 1 may perform this determination.

If the surface is not optically writable (1306), then the mass-storage device 100 indicates to the user that the surface is not optically writable (1308). If the surface is optically writable (1306), then the mass-storage device 100 determines whether the optically writable surface is a label surface or a data surface (1310), and indicates the type of the surface as has been determined to the user (1312). The determination mechanism 116 of FIG. 1 may determine whether the optically writable surface is a label surface or a data surface. Furthermore, the mass-storage device 100 may optionally indicate to the user the amount of space remaining or used on the surface incident to the laser 108 of FIG. 1 (1314), and may optionally instruct the user to remove the disc, flip it over, and re-insert it into the device 100 (1316).

The various indications performed by the mass-storage device 100 can be accomplished in a number of different ways. A different light of the mass-storage device 100 may be lit, for instance, depending on whether the surface of the optical disc incident to the laser 108 of FIG. 1 is an optically writable label surface, an optically writable data surface, or a non-optically writable surface. A light of the device 100 may be lit a different color, depending on the type of the surface of the optical disc, or a different message may be displayed on a display of the device 100. A different audio indication may also be emitted by an audio indicator of the mass-storage device 100 depending on the type of the surface of the optical disc.

Figure 14:
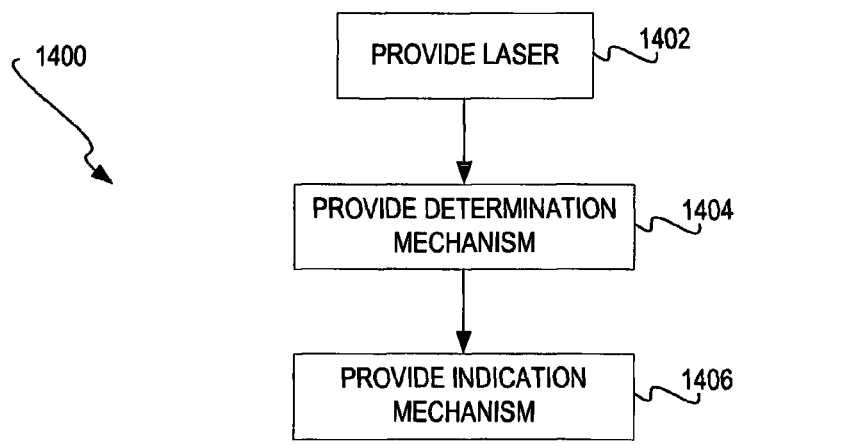
FIG. 14 is a flowchart of a method of manufacture, according to an embodiment of the invention.

FIG. 14 shows a method 1400 for manufacturing the mass-storage device 100, according to an embodiment of the invention. As can be appreciated by those of ordinary skill within the art, the method 1400 may include other parts besides those depicted in FIG. 14, and the parts depicted in FIG. 14 may themselves involve sub-parts. First, a laser is provided (1402). The laser may be the laser 108 of FIG. 1, and is for optically reading from and/or writing to a surface of an optical disc inserted into the mass-storage device to which the laser 108 is incident. Next, a determination mechanism is provided that determines the type of the optical disc surface that is incident to the laser 108 (1404). The determination mechanism may be the mechanism 116 of FIG. 1, such as part of the controller 114 of FIG. 1. Finally, an indication mechanism is provided that indicates the type of the optical disc surface incident to the laser 108 (1406). The indication mechanism may be the mechanism 118 of FIG. 1, and can include one or more single-color or multiple-color lights, a display, an audio indicator, a communication mechanism, and so on.

CONCLUSION

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A mass-storage device comprising:
   a laser to at least optically write to an optically writable surface of an optical disc incident thereto;
   an indication mechanism to indicate whether the optically writable surface incident to the laser is an optically writable label surface or an optically writable data surface of the optical disc; and,
   a determination mechanism to determine whether the optically writable surface incident to the laser is the optically writable label surface or the optically writable data surface of the optical disc based on identifying properties of the optically writable label surface of the optical disc.

2. The mass-storage device of claim 1, wherein the indication mechanism comprises one or more lights.

3. The mass-storage device of claim 2, wherein the one or more lights comprise a first light that is lit to indicate that the optically writable surface incident to the laser is the optically writable label surface and a second light that is lit to indicate that the optically writable surface incident to the laser is the optically writable data surface.

4. The mass-storage device of claim 3, wherein the one or more lights comprise a third light that is lit to instruct a user to remove the optical disc from the mass-storage device, flip the optical disc over, and re-insert the optical disc into the mass-storage device.

5. The mass-storage device of claim 3, wherein the one or more lights comprise a third light that is lit to indicate that a non-optically writable surface of the optical disc is incident to the laser.

6. The mass-storage device of claim 2, wherein the one or more lights comprise a light that is lit in a first color to indicate that the optically writable surface incident to the laser is the optically writable label surface and that is lit in a second color to indicate that the optically writable surface incident to the laser is the optically writable data surface.

7. The mass-storage device of claim 6, wherein the light is lit in a third color to instruct a user to remove the optical disc from the mass-storage device, flip the optical disc over, and re-insert the optical disc into the mass-storage device.

8. The mass-storage device of claim 6, wherein the light is lit in a third color to indicate that a non-optically writable surface of the optical disc is incident to the laser.

9. The mass-storage device of claim 2, wherein the one or more lights are disposed within a front surface of the mass-storage device.

10. The mass-storage device of claim 2, further comprising a translucent loading mechanism receptive to the optical disc, the one or more lights disposed within the mass-storage device such that the translucent loading mechanism is lighted.

11. The mass-storage device of claim 1, wherein the indication mechanism comprises a display.

12. The mass-storage device of claim 11, wherein the display displays a first message to indicate that the optically writable surface incident to the laser is the optically writable label surface and displays a second message to indicate that the optically writable surface incident to the laser is the optically writable data surface.

13. The mass-storage device of claim 11, wherein the display displays a message to instruct a user to remove the optical disc from the mass-storage device, flip the optical disc over, and re-insert the optical disc into the mass-storage device.

14. The mass-storage device of claim 11, wherein the display displays a message to indicate that a non-optically writable surface of the optical disc is incident to the laser.

15. The mass-storage device of claim 11, wherein the display displays a message to indicate space remaining on the optically writable surface of the optical disc incident to the laser.

16. The mass-storage device of claim 1, wherein the indication mechanism comprises an audio indicator.

17. The mass-storage device of claim 16, wherein the audio indicator emits a first audio indication to indicate that the optically writable surface incident to the laser is the optically writable label surface and emits a second audio indication to indicate that the optically writable surface incident to the laser is the optically writable data surface.

18. The mass-storage device of claim 16, wherein the audio indicator emits an audio indication to instruct a user to remove the optical disc from the mass-storage device, flip the optical disc over, and re-insert the optical disc into the mass-storage device.

19. The mass-storage device of claim 16, wherein the audio indicator emits an audio indication to indicate that a non-optically writable surface of the optical disc is incident to the laser.

20. The mass-storage device of claim 16, wherein the audio indicator is capable of emitting one or more audio indications, each audio indication one or more of: a spoken indication, a tonal indication, and a sound indication.

21. The mass-storage device of claim 1, wherein the indication mechanism comprises a communication mechanism to communicate indication of the optically writable surface incident to the laser to a host device to which the mass-storage device is communicatively coupled.

22. A mass-storage device comprising:
a laser to at least optically write to an optically writable surface of an optical disc incident thereto;
means for indicating whether the optically writable surface incident to the laser is an optically writable label surface or an optically writable data surface; and,
means for determining whether the optically writable surface incident to the laser is the optically writable label surface or the optically writable data surface of the optical disc based on identifying properties of the optically writable label surface of the optical disc.

23. The mass-storage device of claim 22, wherein the means comprises at least one of: one or more single-color lights; one or more multiple-color lights; a display; an audio indicator; and a communications mechanism.

24. The mass-storage device of claim 22, wherein the means is further for instructing a user to remove the optical disc from the mass-storage device, flip the optical disc over, and re-insert the optical disc into the mass-storage device.

25. The mass-storage device of claim 22, wherein the means is further for indicating that a non-optically writable surface of the optical disc is incident to the laser.

26. The mass-storage device of claim 22, wherein the means is further for indicating space remaining on the optically writable surface of the optical disc incident to the laser.

27. A method comprising:
determining by a mass-storage device whether a surface of an optical disc inserted in the device and incident to a laser of the device is an optically writable data surface, an optically writable label surface, or a non-optically writable surface; and,
indicating by the mass-storage device whether the surface of the optical disc is the optically writable data surface, the optically writable label surface, or the non-optically writable surface.

28. The method of claim 27, further initially comprising receiving the optical disc by the mass-storage device.

29. The method of claim 27, further comprising indicating by the mass-storage device space remaining on the surface of the optical disc.

30. The method of claim 27, wherein indicating whether the surface of the optical disc is the optically writable data surface or the optically writable label surface comprises lighting a different light of the mass-storage device based on whether the surface is the optically writable data surface or the optically writable label surface.

31. The method of claim 27, wherein indicating whether the surface of the optical disc is the optically writable data surface or the optically writable label surface comprises lighting a light of the mass-storage device a different color based on whether the surface is the optically writable data surface or the optically writable label surface.

32. The method of claim 27, wherein indicating whether the surface of the optical disc is the optically writable data surface or the optically writable label surface comprises displaying a different message by the mass-storage device based on whether the surface is the optically writable data surface or the optically writable label surface.

33. The method of claim 27, wherein indicating whether the surface of the optical disc is the optically writable data surface or the optically writable label surface comprises emitting a different audio indication by the mass-storage device based on whether the surface is the optically writable data surface or the optically writable label surface.

34. The method of claim 27, wherein indicating whether the surface of the optical disc is the optically writable data surface or the optically writable label surface comprises communicating indication of the optically writable surface incident to the laser to a host device to which the mass-storage device is communicatively coupled.

35. A method comprising:
providing a laser of a mass-storage device to which a surface of an optical disc is incident; and,
providing an indication mechanism of the mass-storage device to indicate whether the surface is an optically writable label surface, an optically writable data surface, or a non-optically writable surface of the optical disc.

36. The method of claim 35, further comprising providing a determination mechanism of the mass-storage device to determine whether the surface incident to the laser is the optically writable label surface, the optically writable data surface, or the non-optically writable surface of the optical disc.

37. The method of claim 35, wherein providing the indication mechanism comprises at least one of providing one or more single-color lights; providing one or more multiple-color lights; providing a display; providing an audio indicator; and providing a communications mechanism.

* * * * *